United States Patent [19]
Schneider

[11] Patent Number: 5,863,976
[45] Date of Patent: Jan. 26, 1999

[54] HARDENABLE SEALING COMPOUND

[75] Inventor: Friedhelm Schneider, Reichshof-Wiehl, Germany

[73] Assignee: B & F Formulier- und Abfuell GmbH, Drolshagen-Iseringhausen, Germany

[21] Appl. No.: 858,049

[22] Filed: May 16, 1997

[30] Foreign Application Priority Data

May 18, 1996 [DE] Germany ............... 196 20 100.4

[51] Int. Cl.⁶ ........................................ C08J 3/20
[52] U.S. Cl. ................. 524/476; 524/490; 524/588; 524/848; 524/863; 528/34
[58] Field of Search ..................... 524/490, 476, 524/588, 848, 863; 528/34

[56] References Cited

U.S. PATENT DOCUMENTS

| | | | |
|---|---|---|---|
| 4,312,801 | 1/1982 | Hiriart Bodin et al. | 260/31.2 R |
| 4,357,438 | 11/1982 | Sattlegger et al. | 524/490 |
| 5,725,922 | 3/1998 | Nakamura et al. | 428/36.9 |

FOREIGN PATENT DOCUMENTS

| | | |
|---|---|---|
| 0 043 501 | 1/1982 | European Pat. Off. . |
| 0 158 141 | 10/1985 | European Pat. Off. . |
| 29 08 036 | 7/1980 | Germany . |
| 30 25 376 | 2/1982 | Germany . |
| 34 16 694 | 11/1985 | Germany . |
| 35 44 619 | 6/1987 | Germany . |
| 44 15 396 | 11/1995 | Germany . |
| 196 14 140 | 4/1996 | Germany . |
| 07286162A | 10/1995 | Japan . |

*Primary Examiner*—Margaret W. Glass
*Attorney, Agent, or Firm*—Flynn, Theil, Boutell & Tanis, P.C.

[57] ABSTRACT

A sealing compound with a silicone polymer as the base, a cross-linking agent and an accelerator and fillers to be added as needed and a softener, which hardens during contact with the environmental moisture, through addition of heat or through combination of its constituents (2K-products). The softener consists entirely or partially of a paraffinic hydrocarbon, in which the percentage of the cyclical paraffinic hydrocarbons is in the range of 36 to 40% and the percentage of the noncyclical paraffinic hydrocarbons is in the range of 60 to 64%.

5 Claims, No Drawings

HARDENABLE SEALING COMPOUND

FIELD OF THE INVENTION

The invention relates to a sealing compound with a silicone polymer as the base, a cross-linking agent and an accelerator and fillers to be added as needed and a softener, which hardens during contact with ambient moisture, through addition of heat or through combination of its components (2K-products) in which a first components contains an accelerator and a second component contains a cross-linking agent.

BACKGROUND OF THE INVENTION

Sealing compounds of this type are extensively used in the building industry both on the inside and also on the outside for sealing off of building and expansion joints. Such a sealing compound is described in DE-OS 29 08 036, in which at least a part of the silicone compounds, which are used therein and are not capable of reaction, is replaced while maintaining the reactive polysiloxanes and instead organic alkylaromatic compounds are added, which each have a molecular weight of over 200. Whereas the use, for example, of a paraffinic hydrocarbon oil is not considered to be advantageous because the sealing compounds created therewith are unstable and exude during hardening.

SUMMARY OF THE INVENTION

The basic purpose of the invention is to provide a sealing compound which is significantly less expensive to manufacture.

This purpose is attained according to the invention by providing a sealing compound with a silicone polymer as the base, a cross-linking agent and an accelerator and fillers to be added as needed and a softener, which hardens during contact with the environmental moisture, through addition of heat or through combination of its components (2K-products) in which a first component contains an accelerator and a second component contains a cross-linking agents. The softener consists entirely or partially of a paraffinic hydrocarbon, in which the percentage of the cyclical paraffinic hydrocarbons is in the range of 36 to 40% and the percentage of the noncyclical paraffin oils is in the range of 58 to 64%.

The use of a paraffinic hydrocarbon mixture, which consists of 36 to 40% cyclical and 58 to 64% noncyclical paraffinic hydrocarbons, results in a stable sealing compound which does not exude in the hardened state. The carbon atom number lies advantageously between 14 to 23 C-atoms, whereby the flash point lies at approximately 160%, the density at approximately 850 kg/m³ and the aniline point at approximately 101° C.

According to the invention it is now possible to extensively use paraffinic hydrocarbons for controlling the physical-chemical characteristics of the sealing compound without disadvantageous effects like exudation appearances occurring when they are used on buildings. The manufacturing costs for the softener are thus significantly reduced.

A paraffinic hydrocarbon has proven to be particularly advantageous when it has a carbon atom number of between 16 to 21 C-atoms and in which the percentage of noncyclical to cyclical paraffinic hydrocarbons is in the range of 62 to 38%.

The sealing compounds moreover also have very good stabilizing characteristics.

The sealing compound according to the invention has the following composition in percentage by weight:

| | |
|---|---|
| 5–12% | thickening agent |
| 0–30% | fillers |
| 0.01–0.5% | reaction accelerator |
| 30–60% | silicone polymer |
| 10–30% | softener |
| 2.5–6% | cross-linking agent |

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. In a sealing composition comprising a silicone polymer, a cross-linking agent, an accelerator, a softener and, optionally, fillers, which hardens through at least one of contact with ambient moisture, contact with heat, or through the combination of a first component containing the accelerator and a second component containing the cross-linking agent, the improvement comprising the softener being a mixture of paraffinic hydrocarbons consisting of 36–40% by weight cyclical paraffinic hydrocarbons and 64–60% by weight noncyclical paraffinic hydrocarbons, said paraffinic hydrocarbons containing from 16–23 carbon atoms per molecule.

2. The sealing composition according to claim 1, wherein the percentage of cyclical paraffinic hydrocarbons is 38% and the percentage of noncyclical paraffinic hydrocarbons is 62%.

3. The sealing composition according to claim 2, wherein the flash point of said mixture of paraffinic hydrocarbons is approximately 160° C., the density thereof is 850 kg/m³ and the aniline point thereof is approximately 101° C.

4. The sealing composition according to claim 1, wherein the sealing composition has the following composition in percentage by weight:

| | |
|---|---|
| 5–12% | thickening agent |
| 0–30% | fillers |
| 0.01–0.5% | reaction accelerator |
| 30–60% | silicone polymer |
| 10–30% | softener |
| 2.5–6% | cross-linking agent. |

5. The sealing composition according to claim 1, additionally comprising at least one of nonreactive polysiloxanes, organic or aliphatic compounds as a softener.

* * * * *